United States Patent
Nagamitsu et al.

(10) Patent No.: US 8,449,268 B2
(45) Date of Patent: May 28, 2013

(54) FAN AND METHOD FOR MANUFACTURING THE SAME

(75) Inventors: Takashi Nagamitsu, Kyoto (JP); Yoshihisa Kato, Kyoto (JP); Hiromasa Sumida, Kyoto (JP); Masayuki Matsushita, Kyoto (JP); Kouji Muraoka, Kyoto (JP); Yusuke Yoshida, Kyoto (JP)

(73) Assignee: Nidec Corporation, Kyoto (JP)

( * ) Notice: Subject to any disclaimer, the term of this patent is extended or adjusted under 35 U.S.C. 154(b) by 1649 days.

(21) Appl. No.: 11/681,849

(22) Filed: Mar. 5, 2007

(65) Prior Publication Data

US 2007/0207044 A1 Sep. 6, 2007

(30) Foreign Application Priority Data

Mar. 6, 2006 (JP) ................................. 2006-060335

(51) Int. Cl.
*F04B 35/04* (2006.01)
*B23P 15/02* (2006.01)

(52) U.S. Cl.
USPC ........................ 417/353; 417/354; 29/888.025

(58) Field of Classification Search
USPC ................. 417/353, 354, 423.15; 29/888.025
See application file for complete search history.

(56) References Cited

U.S. PATENT DOCUMENTS

| 5,341,777 | A | 8/1994 | Miura et al. | |
|---|---|---|---|---|
| 2004/0062648 | A1* | 4/2004 | Makinson et al. | 416/3 |
| 2005/0058544 | A1* | 3/2005 | Omi | 415/220 |
| 2005/0233688 | A1* | 10/2005 | Franz | 454/157 |

FOREIGN PATENT DOCUMENTS

| JP | 64-74049 A | 3/1989 |
|---|---|---|
| JP | 5-252704 A | 9/1993 |
| JP | 2931044 B2 | 8/1999 |
| JP | 2002-142392 A | 5/2002 |
| JP | 2003-111365 A | 4/2003 |
| JP | 3446373 B2 | 9/2003 |
| WO | WO 2004000466 A1 * | 12/2003 |

* cited by examiner

*Primary Examiner* — Charles Freay
*Assistant Examiner* — Philip Stimpert
(74) *Attorney, Agent, or Firm* — Keating & Bennett, LLP

(57) ABSTRACT

A fan includes a shaft, a hollow, approximately cylindrical rotor yoke that rotates around the shaft as a rotation axis and is open toward one of its axial ends, a rotor magnet secured to an inner circumference of the rotor yoke, and an impeller secured to an outer circumference of the rotor yoke and arranged to rotate together with the rotor yoke to generate an air flow. One of the impeller and the rotor yoke is provided with an index used for circumferentially positioning the impeller or the rotor yoke.

10 Claims, 15 Drawing Sheets

FAN AND METHOD FOR MANUFACTURING THE SAME

BACKGROUND OF THE INVENTION

1. Field of the Invention

The present invention relates to correction of rotational unbalance of an impeller in a fan and an unbalance correction method for the fan.

2. Description of the Related Art

Electronic devices are provided with fans for dissipating heat generated in the electronic devices. Recently, the amount of the generated heat continues to increase with the improvement of the performance of the electronic devices, thus requiring the fans to have a higher performance. In order to achieve this, both flow-rate characteristics and static-pressure characteristics have to be improved. This can be achieved by driving fans to rotate at high speeds. On the other hand, reduction of both noise and vibration are required for many electronic devices used in homes and offices.

A rotating part of a fan, i.e., a rotor, includes a driving magnet, a rotor yoke, a shaft, and an impeller having a plurality of blades. The rotor rotates around the shaft as a rotation axis. When rotation of the rotor is unbalanced, the rotor vibrates during rotation. The magnitude of the vibration of the rotor is small in a case where the degree of unbalance is small or the rotor rotates at low speeds. However, in a case where the degree of unbalance is large or the rotor rotates at high speeds, the magnitude of the vibration of the rotor is large and the vibration is transferred to an electronic device in which the fan is incorporated. The transferred vibration adversely affects the electronic device, and causes resonance with other components in the electronic device. The resonance may generate a harsh noise. In order to avoid this problem, it is necessary to reduce the degree of unbalance of the rotor to a minimum.

In accordance with a conventional technique, the rotational unbalance of the rotor of the fan is corrected in the following manner. (1) A value indicating the degree of rotational unbalance of the assembled rotor is measured. Hereinafter, this value is referred to as "unbalance value". (2) Balance weight in the form of paste is applied to a portion of the rotor to correct the unbalance. (3) The unbalance value is measured again, and steps (1) and (2) are repeated until the measured unbalance value is reduced below a predetermined acceptable level. (4) When the measured unbalance value is reduced below the predetermined acceptable level, the rotor is baked or left in an atmosphere in order to remove a vaporizing component in the balance weight.

However, this unbalance correction technique requires a considerable number of man-hours. Moreover, to leave the rotor in an atmosphere or bake the rotor to cause vaporization of the vaporizing component takes a considerable amount of time. Furthermore, the precision of the correction depends on the ability of the operator who performs the correction.

SUMMARY OF THE INVENTION

According to preferred embodiments of the present invention, a fan is provided which includes a shaft; a hollow, approximately cylindrical rotor yoke connected to the shaft and rotating around the shaft as a rotation axis; a rotor magnet secured to an inner circumference of the rotor yoke; and an impeller secured to an outer circumference of the rotor yoke and rotating together with the rotor yoke to generate an air flow. One of the impeller and the rotor yoke is provided with an index used for circumferentially positioning the impeller or the rotor yoke.

According to preferred embodiments of the present invention, it is possible to circumferentially fix each of an impeller, a rotor yoke, and a rotor magnet by use of an exclusive tool or fixing jig, when the impeller, the rotor yoke, and the rotor magnet are combined with one another. Therefore, a variation in the precision of the correction of rotational unbalance caused by a variation in an operator's ability is minimized.

Moreover, since a rotor yoke index and an impeller index are formed on the rotor yoke and the impeller, respectively, it is possible to correct the rotational unbalance of the rotor yoke and the impeller at the same time. Thus, the cost for designing a mold and a die can be reduced.

Other features, elements, steps, advantages and characteristics of the present invention will become more apparent from the following detailed description of preferred embodiments thereof with reference to the attached drawings.

DETAILED DESCRIPTION OF THE PREFERRED EMBODIMENTS

Figure 1:
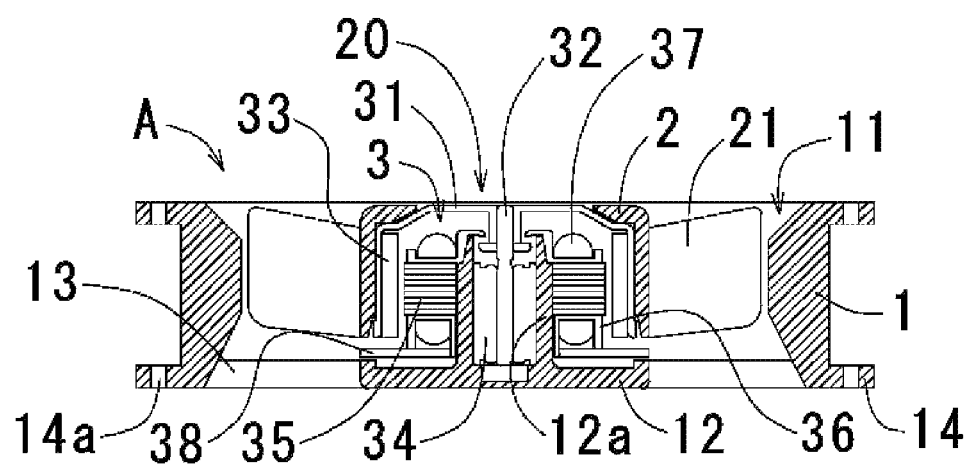
FIG. 1 is a cross-sectional view of a fan according to a first preferred embodiment of the present invention.

Referring to FIGS. 1 through 15, preferred embodiments of the present invention will be described in detail. It should be noted that in the explanation of the present invention, when positional relationships among and orientations of the different components are described as being up/down or left/right, ultimate positional relationships and orientations that are in the drawings are indicated; positional relationships among and orientations of the components once having been assembled into an actual device are not indicated. Additionally, in the following description, an axial direction indicates a direction parallel to a rotation axis, and a radial direction indicates a direction perpendicular to the rotation axis.

In general, the rotational unbalance of a rotating object is caused by a weight unbalance of the object. In the aforementioned conventional technique for correcting the rotational unbalance, a circumferential position of a portion of the weight unbalance is detected, and thereafter a balance weight is added to adjust the rotational balance. That is, correction of the rotational unbalance is performed on a lighter one of the radially opposed portions of the rotating object. On the other hand, according to preferred embodiments of the present invention, the circumferential position of the portion causing the rotational unbalance, i.e., the circumferential position of the portion of the weight unbalance is detected, and then correction of the rotational unbalance is performed on a heavier one of the radially opposed portions of the rotating object in various ways. Please note that in the following description, a "portion causing rotational unbalance" refers to a heavier one of radially opposed portions of the rotating object that are not equal in weight.

First Preferred Embodiment

Figure 2:
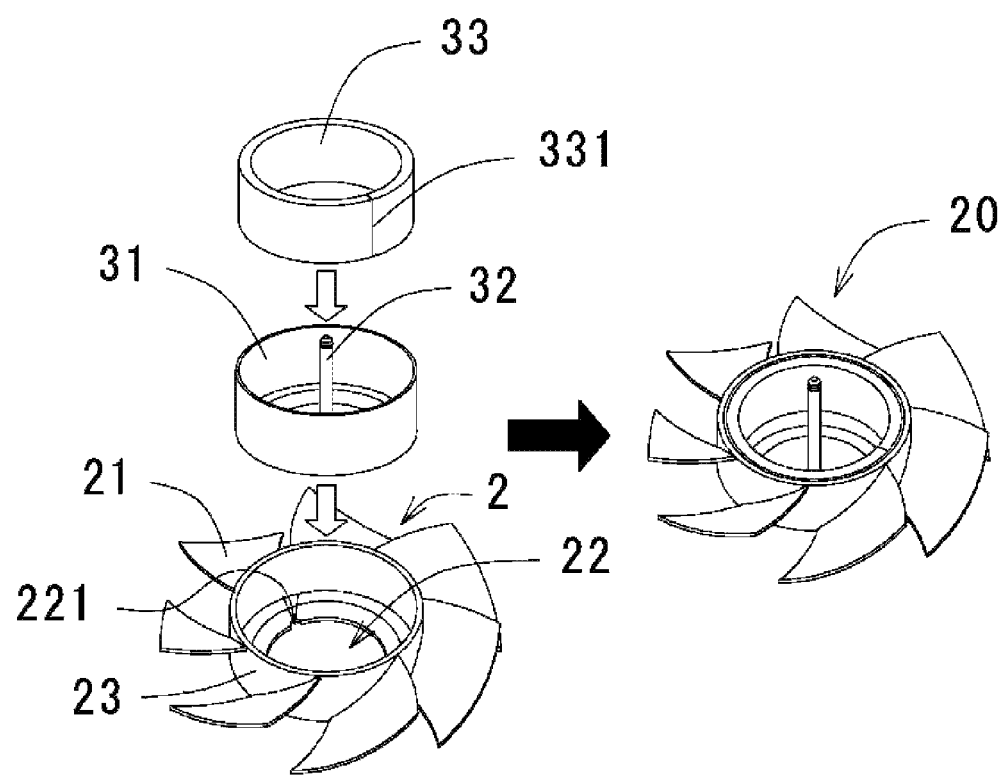
FIG. 2 is a perspective view of a rotor in the fan of FIG. 1.

FIG. 1 is a cross-sectional view of a fan according to a first preferred embodiment of the present invention. FIG. 2 is a perspective view of a rotor in the fan of FIG. 1. In the description of this preferred embodiment, the rotor is described as an impeller assembly.

The fan A includes an impeller 2 having a plurality of blades 21. The impeller 2 is attached to an approximately cylindrical rotor yoke 31. The cylindrical rotor yoke 31 is hollow and opens downward, and is driven to rotate around a rotational axis when an electrical current is supplied to the rotor yoke 31. The rotor yoke 31 includes a shaft 32 arranged coaxially with the rotational axis. One end of the shaft 32 is secured to a center of the rotor yoke 31. In the example of FIG. 1, an axially upper end of the shaft 32 is secured to the rotor yoke 31.

The fan A also includes a base portion 12 opposed to the rotor yoke 31. The base portion 12 includes an approximately cylindrical bearing housing 12a, which is hollow and has a bottom, at a center thereof. A sleeve 34 is press-fitted into the bearing housing 12a and supported by the bearing housing 12a. The sleeve 34 has a hole extending in the axial direction. The shaft 32 is inserted into the hole. A shaft-side surface of the sleeve 34 and a sleeve-side surface of the shaft 34 define a radial bearing.

In this preferred embodiment, the radial bearing is an oil-impregnated bearing using a sleeve made of porous material, such as a sintered material, and impregnated with lubricating oil. The shaft 32 is supported by the radial bearing via lubricating oil in a rotatable manner around the rotation axis. The radial bearing is not limited to the above-described sliding bearing. For example, a roller bearing such as a ball bearing may be used. The type of bearing is chosen considering required characteristics and costs of the fan A.

The fan A also includes a stator 3 supported radially outside the bearing housing 12a. The stator 3 includes a stator core 35, a coil 37, an insulator 36, and a circuit board 38. Axially upper and lower ends of the stator core 35 are surrounded by the insulator 36 which is made of an insulating material. The insulator 36 is also formed to surround each tooth of the stator core 35. The coil 37 is wound around the teeth of the stator core 35 with the insulator 36 interposed therebetween.

The circuit board 38 for controlling rotation of the impeller 2 is arranged below the stator 3, that is, on a base-portion side of the stator 3. The circuit board 38 includes a printed circuit board and electronic components (not shown) mounted thereon. On the printed circuit board, lands on which the electronic components are to be mounted and a wiring pattern for electrically connecting the electronic components with each other are printed. When the electronic components are mounted on the lands, a circuit for controlling rotation of the impeller 2 is formed on the printed circuit board. Please note that a single electronic component can, in some instances, define the control circuit. An end of the coil 37 is electrically connected to at least one of the electronic components. The circuit board 38 is secured to the insulator 36. A current supplied from the outside of the fan A to the circuit board 38 is supplied to the coil 37 via the electronic components, e.g., an IC and a Hall element, thereby generating a magnetic field around the stator core 35.

On an inner circumferential surface of the impeller 2 are provided the rotor yoke 31 and a rotor magnet 33. The rotor yoke 31 reduces flux leakage to the outside of the fan A. The rotor magnet 33 is attached to an inner circumferential surface of the rotor yoke 31, and is magnetized in a circumferential direction to define a multipole magnet in which poles are alternately arranged in the circumferential direction. When the shaft 32 secured to the center of the rotor yoke 31 is inserted into the sleeve 34, the rotor magnet 33 is opposed to the stator core 35 in a radial direction.

When a current is supplied to the coil 37 of the stator 3, the magnetic field generated by the stator core 35 and a magnetic field formed by the rotor magnet 33 interact with each other, thereby generating a torque applied to the impeller 2. Thus, the impeller 2 rotates around a center of the shaft 32, i.e., the rotation axis. During rotation of the impeller 2, a change in magnetic flux from the rotating rotor magnet 33 is detected by a Hall element and a direction in which the current flows, i.e., polarity of the current is switched by a driving IC. In this manner, the rotation of the impeller 2 is controlled to be stable. The rotation of the impeller 2 makes the blades 21 push air from the impeller 2 side to the base portion 12 side, so that an axial air flow is generated.

The base portion 12 is axially opposed to the circuit board 38 and has an approximately circular shape having approximately the same diameter as an outer diameter of the circuit board 38. The base portion 12 is connected to a housing 1 via four ribs 13, for example. The number of the ribs 13 is not limited to four. Three or less ribs or five or more ribs may be provided.

The housing 1 includes a chamber 11 that surrounds an outer circumference of the impeller 21. The chamber 11 defines a passage of air flow generated by rotation of the impeller 2. In this preferred embodiment, the housing 1 is preferably square or substantially square when seen in the axial direction. At each of the axially upper and lower ends of the housing 1, a square or substantially square frame is arranged along an outer periphery of the housing 1. A flange 14 is provided at each of the four corners of the square frame and projects radially outward. The flange 14 is provided with a hole 14a into which a screw or the like can be inserted when the fan A is attached to an electronic device. The four ribs 13 are arranged at regular circumferential intervals.

In the fan A having the above-described structure, the rotational unbalance of the impeller assembly 20 is corrected in the following manner.

Figure 11:
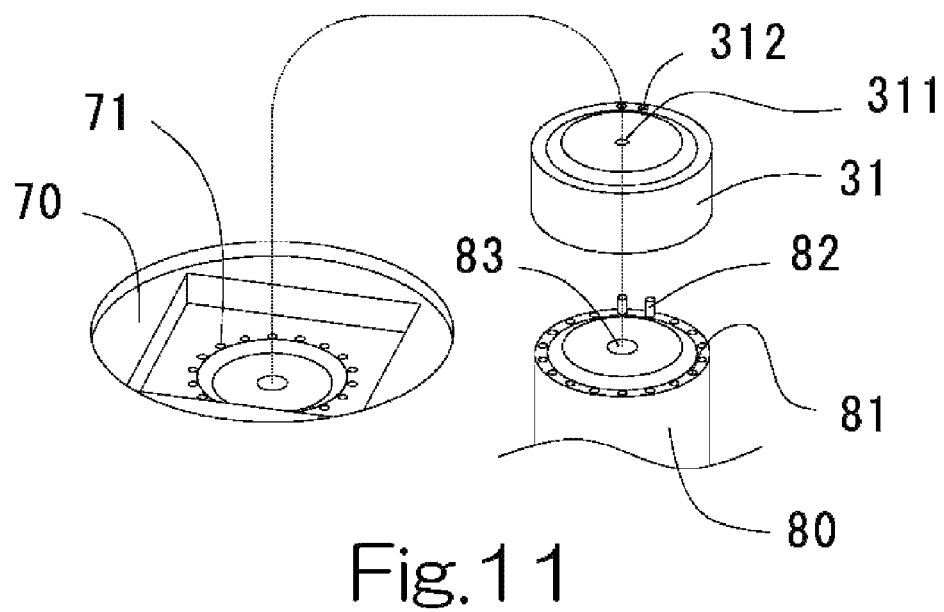
FIG. 11 is a perspective view illustrating a die used for forming a rotor yoke by pressing.
Figure 12:
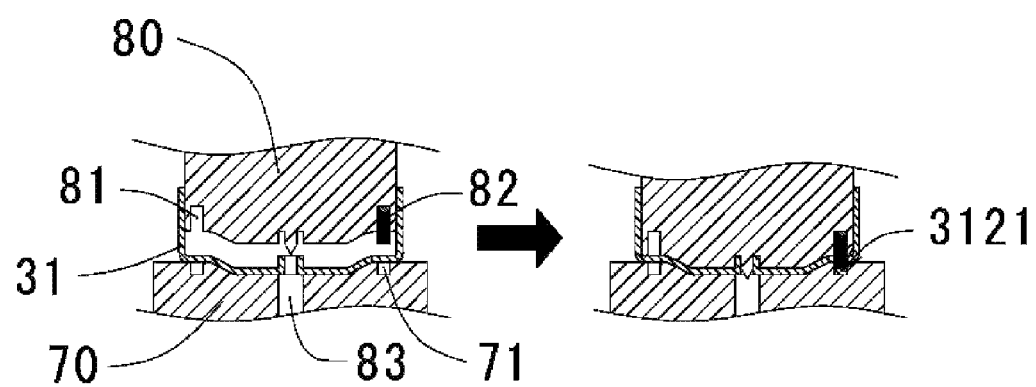
FIG. 12 is a cross-sectional view illustrating the die used for forming the rotor yoke by pressing.

FIGS. 11 and 12 are a perspective view and a cross-sectional view of a processing stage for forming a through hole 312 in the rotor yoke 31 according to this preferred embodiment of the present invention, respectively. The rotor yoke 31 is formed by a progressive pressing machine including a plurality of processing stages. The rotor yoke 31 is formed from magnetic material having a good anticorrosion property, for example, stainless steel sheet.

First, a long band-like stainless steel sheet which is wound into a coil is fed to the pressing machine. The stainless steel sheet is then deep-drawn into a rotor yoke 31 in the form of a hollow, cylindrical cup, as shown in FIG. 11. A shaft connecting portion 311, which is hollow and cylindrical and to which the shaft 32 is to be attached, is formed by burring. Then, the rotor yoke 31 is separated from the coil of stainless steel sheet by trimming. In this manner, formation and shaping of the rotor yoke 31 are performed.

Figure 5:
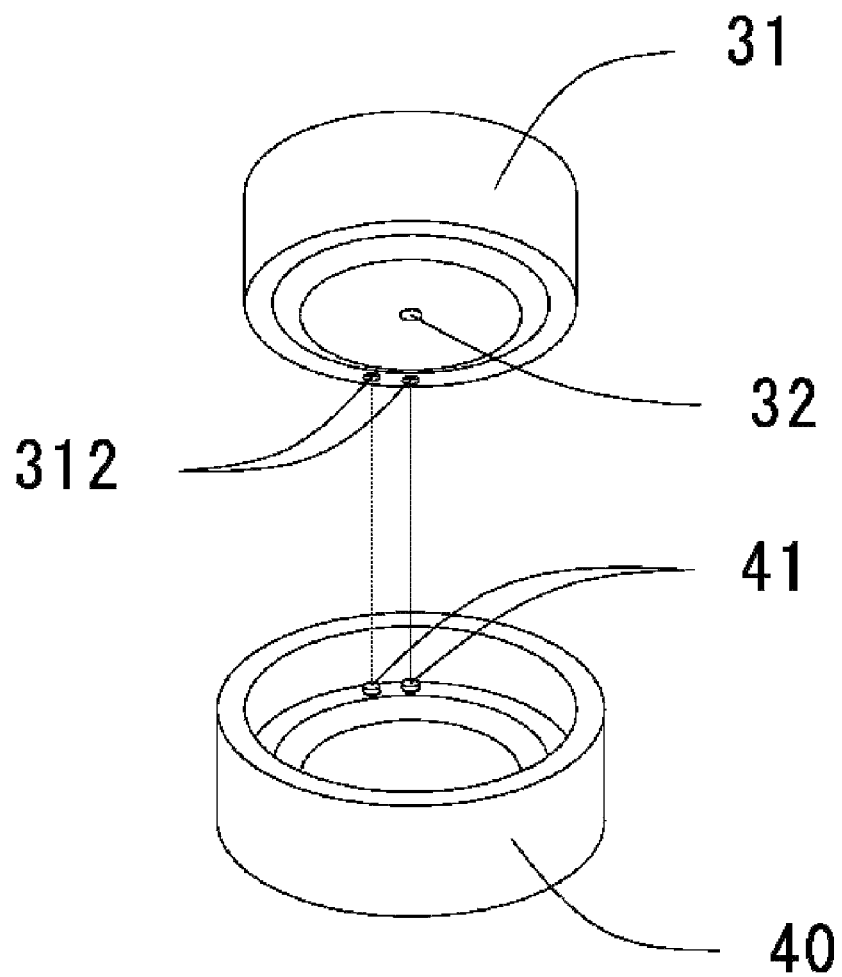
FIG. 5 is a perspective view of a rotor yoke base according to the first preferred embodiment of the present invention.

The shaft 32 is press-fitted into the shaft connecting portion 311 of the rotor yoke 31. Then, the rotational unbalance of the rotor yoke 31 rotating around the shaft 32 is measured. In general, a plurality of rotor yokes 31 formed by using the same die tend to have a rotational unbalance at approximately the same circumferential position (or circumferential positions that are very close to each other) relative to the rotation axis. The rotational unbalance can be corrected to some degree by processing a surface of the die. However, the correctable degree of rotational unbalance is quite small. Therefore, the through hole 312 is formed in an end surface of the rotor yoke 31 having the shaft connecting portion 311 formed therein, as shown in FIG. 5, so as to correct the rotational unbalance.

The through hole 312 is formed by the progressive pressing machine. The pressing machine includes a processing stage for forming the through hole 312 (hereinafter, referred to as a through hole forming stage). The through hole forming stage is arranged in a series of stages for deep-drawing, burring, trimming, and the like, especially immediately before the trimming stage. The through hole forming stage includes a die 70 and a punch 80, as shown in FIG. 11. One of the die 70 and the punch 80 is a moving part, while the other is a fixed part. The die 70 is usually fixed. When the pressing machine slides the moving part toward the fixed part, the rotor yoke 31 is sandwiched between the die 70 and the punch 80 and the through hole 312 is formed by shearing.

The punch 80 includes a circular recess 83 at its center. The circular recess 83 receives the shaft connecting portion 311 of the rotor yoke 31 therein. Punching pin holders 81 are annularly arranged at regular circumferential intervals about a center of the circular recess 83. The die 70 includes a plurality of die pieces 71 annularly arranged at regular circumferential intervals. The die pieces 71 are arranged to correspond to the punching pin holders 81 of the punch 80, respectively, when the die 70 and the punch 80 are joined.

Once a series of dies for respective stages are completed, a test rotor yoke 31 is formed by pressing through the respective stages. A rotational unbalance of the test rotor yoke 31 is measured. In this measurement, a value indicating the degree of rotational unbalance (hereinafter, referred to as a rotational unbalance value) is obtained. At the same time, a circumferential position of a portion of the rotor yoke 31, causing the rotational unbalance, is determined. Then, a through hole 312 is formed in the rotor yoke 31 at a position that is symmetrical to the determined circumferential position with respect to the rotation axis (i.e., a position approximately opposite to the determined circumferential position in the radial direction). That is, the through hole 312 is formed 180° from the determined circumferential position around the rotation axis. More specifically, a punching pin 82 is inserted and secured into a punching pin holder 81 at the position corresponding to the position where the through hole 312 is to be formed. In this state, a rotor yoke 31 is formed by the pressing machine. As shown in FIG. 12, when the punch 80 is made to move toward the die 70, the punching pin 82 is pressed against the portion of the rotor yoke 31 where the through hole 312 is to be formed, and stamps out that portion by shearing. The portion 3121 cut from the rotor yoke 31 is pushed into the die 71. In this manner, the through hole 312 is formed in the end surface of the rotor yoke 31 where the shaft connecting portion 311 is formed.

The degree of rotational unbalance corrected by forming the through hole 312 corresponds to a product of the weight M (g) of the portion removed from the rotor yoke 31 and the radial distance L (cm) between the rotation axis of the rotor yoke 31 and the through hole 312. That is, a rotational unbalance of ML (g×cm) can be corrected (hereinafter, the unit for rotational unbalance will be omitted). If a rotational unbalance value before correction is larger than ML, the corrected rotational unbalance can be increased by putting another punching pin 82 into a punching pin holder 81 adjacent to the aforementioned pin holder 81. In order to completely eliminate the rotational unbalance, it is necessary to precisely locate the portion having a weight unbalance (which causes the rotational unbalance), and adjust this weight unbalance with high precision. However, this may be impossible because the location of the portion having the weight unbalance may be slightly shifted from the closest portion where a through hole can be formed. In addition, the weight that needs to be adjusted may not necessarily be the same as the weight adjusted by a through hole, or integral multiples thereof. For these reasons, even if correction of the rotational unbalance by forming through holes may not make the rotational unbalance absolutely zero, the rotational unbalance can be effectively minimized.

A position of a portion causing the rotational unbalance of the rotor yoke 31 is different between different production lots. Variations in material for the rotor yoke 31 (e.g., variations in thickness and composition of the sheet processed into the rotor yoke 31), a temperature condition, a processing speed, and the like may affect the circumferential position of the portion causing the rotational unbalance and the rotational unbalance value. For this reason, the number of punching pins to be inserted and the location of formation of at least one through hole 312 are changed for every production lot. This enables appropriate correction of the rotational unbalance. After correction of the rotational unbalance, the shaft 32 is press-fitted and fastened to the shaft fastening portion 311 of the rotor yoke 31.

In the above, how to correct the rotational unbalance is described by referring to a rotor yoke 31 that opens downward. However, the correction method described above can be also applied to a cylindrical rotor yoke that opens upward in the same manner.

Figure 3:
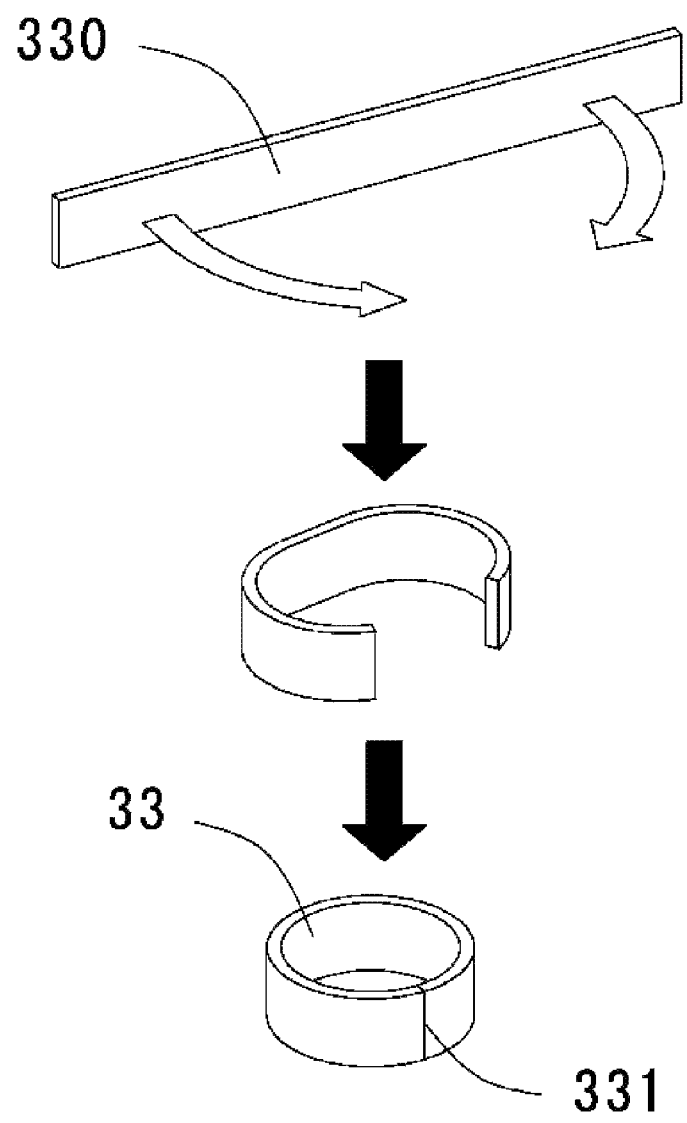
FIG. 3 is a perspective view of a rotor magnet in the fan of FIG. 1.
Figure 4:
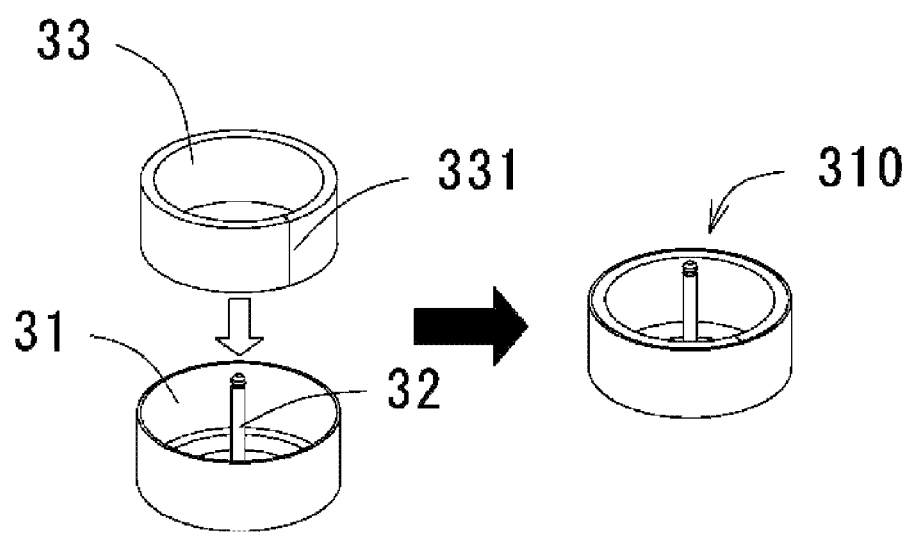
FIG. 4 is a perspective view illustrating in detail a rotor yoke assembly in the fan of FIG. 1.

Next, how to correct the rotational unbalance of a combination of the rotor yoke 31, whose rotational unbalance has been corrected in accordance with the above-described steps, and the rotor magnet 33 is described. FIG. 3 is a perspective view of the rotor magnet according to the first preferred embodiment of the present invention. FIG. 4 is a perspective view illustrating a rotor yoke assembly in detail according to the first preferred embodiment of the present invention.

Many fans use rubber magnets among the various types of bonded ferrite magnets. A rubber magnet is obtained by mixing magnetic powders with rubber and shaping the mixture into a sheet by a roller. The rubber magnet in the form of a sheet is cut into predetermined lengths, so that a plurality of rubber magnet plates 330 are obtained. Each rubber magnet plate 330 is rolled to bring both longitudinal ends thereof into contact with each other, as shown with white arrows in FIG. 3. Thus, a roll-shaped rotor magnet 33 having a joint 331 is formed. The joint 331 causes a weight unbalance, resulting in an unbalanced rotation of the rotor magnet 33 around a center axis of the roll-shaped rotor magnet 33.

As shown in FIG. 4, the rotor magnet 33 is press-fitted and secured to an inner surface of the rotor yoke 31. Adhesive may be applied on surfaces of the rotor magnet 33 and the rotor yoke 31 that are in contact with each other in order to improve the resistance against detachment of the rotor magnet 33 from the rotor yoke 31. The rotor yoke 31 and the rotor magnet 33 are combined with each other so as to offset their rotational unbalances from each other. More specifically, in a case where rotor yokes 31 manufactured in accordance with the aforementioned manufacturing method are in the same production lot by using the same pressing dies, the rotor yokes 31 have a rotational unbalance at approximately the same circumferential position. Therefore, it is possible to locate the circumferential position of the rotational unbalance by using the through hole 312 formed in the rotor yoke 31 as an index. Accordingly, a circumferential positional relationship between the rotor yoke 31 and the rotor magnet 33, that enables the rotational unbalances of the rotor yoke 31 and the rotor magnet 33 to be offset, can be determined based on the through hole 312 in the rotor yoke 31 as the rotor yoke index and the joint 331 of the rotor magnet 33.

The rotor magnet 33 is press-fitted into the rotor yoke 31 by a rotor magnet press-fitting machine. First, a rubber magnet plate 330 is inserted into the rotor magnet press-fitting machine, and a rotor yoke 31 is placed on a rotor yoke base 40 of the rotor magnet press-fitting machine, as shown in FIG. 5. Then, the rotor magnet press-fitting machine is started. The rotor magnet press-fitting machine automatically rolls the rubber magnet plate 330 into a roll-shaped rotor magnet 33 and press-fits it into the rotor yoke 31 to be in contact with the inner circumferential surface of the rotor yoke 31. The rotor magnet press-fitting machine always inserts the rotor magnet 33 with the joint 331 arranged at approximately the same circumferential position with respect to the rotor yoke 31. More specifically, when the rotor yoke 31 is circumferentially positioned with respect to the rotor yoke base 40, a circumferential position of the joint 331 of the to be inserted rotor magnet 33 is determined with respect to the rotor yoke 31. If an operator combines the rotor yoke 31 and the rotor magnet 33 to offset the rotational unbalances thereof, the correction precision may be varied depending on the operator's ability.

In this preferred embodiment, the above-described variation in correction precision can be minimized or prevented in the following manner. As shown in FIG. 5, the rotor yoke base 40 of the rotor magnet press-fitting machine is formed in the shape of a hollow cylinder having a bottom. On the bottom of the rotor yoke base 40 is provided one or more positioning projections 41 corresponding to one or more through holes 312 of the rotor yoke 31. When the rotor yoke 31 is placed in the rotor yoke base 40 with the through hole 312 receiving the positioning projection 41, the rotor yoke 31 is secured at a desired circumferential position with respect to the rotor yoke base 40. Then, the rotor yoke base 40 is secured in the rotor magnet press-fitting machine so as not to change the circumferential position of the rotor yoke 31. In this manner, the rotor magnet 33 can be press-fitted into the rotor yoke 31 at substantially the same circumferential position irrespective of the operator's ability. Thus, the rotational unbalance can be corrected with significantly higher precision. Subsequently, the rotor magnet 33 is magnetized by a magnetizing device while being assembled into a rotor assembly 310 (including the combined rotor yoke 31, rotor magnet 33, and shaft 32).

The impeller 2 is preferably formed of a resin or plastic (hereinafter simply referred to as resin) by injection molding. An exemplary resin is PBT (Polybutylene terephthalate) that is excellent in strength, rigidity, and heat resistance. PBT is easily available and can inexpensively form the impeller 2 having the required characteristics. The material for the impeller 2 can be appropriately changed in accordance with the required characteristics of the fan A. Resins other than PBT may be used. A mold for the impeller 2 is filled with the resin, and thereafter the resin is cooled and solidified by heat exchange between the resin and the mold. The solidified resin defines a molded product, i.e., the impeller 2. During that process, the volume of the resin is reduced by cooling (molding shrinkage). Therefore, it is necessary to design the mold to have dimensions larger than the desired dimensions of the molded product. However, the degree of deformation of the molded product varies depending on its shape (especially, the thickness) and high dimensional accuracy is therefore difficult to achieve. For this reason, it takes a long time to design a mold for the impeller 2 that satisfies the respective required dimensions. Especially, it is difficult to design a mold in which the rotational unbalance is minimized or eliminated.

Considering the above, the impeller 2 is designed to have a shape shown in FIG. 2. A plurality of blades 21 are arranged on an outer circumference of a hollow cylindrical impeller cup 23 to extend radially outward at regular circumferential intervals. The impeller cup 23 has an opening 22 in its bottom. An inner peripheral edge of the bottom of the impeller cup 23, which defines the opening 22, is provided with at least one notch or cut portion 221 (hereinafter, simply referred to as a notch). In a case where a plurality of notches are formed on the inner peripheral edge of the bottom, they have to be arranged irregularly in the circumferential direction. This is because regularly arranged notches cannot serve as indices that enable a circumferential position to be located.

A mold for the impeller 2 mainly includes three parts, i.e., a fixed mold piece, a moving mold piece for the impeller, and a moving mold piece for the impeller cup. When the assembly of these mold pieces is completed, the impeller 2 is formed by resin molding using the mold pieces. The thus-formed impeller 2 is attached to the rotor assembly 310 having a rotational unbalance of approximately zero. Then, a rotational unbalance of the impeller 2 attached to the rotor assembly 30 is measured. In general, impellers 2 formed by using the same mold tend to have a rotational unbalance at substantially the same circumferential position if molding conditions are the same. A small degree of the measured rotational unbalance can be corrected by additional processing (e.g., cutting) a surface of the mold. However, in a case where that correction cannot reduce the measured rotational unbalance value to be equal to or smaller than a rotational unbalance value determined in the specifications of the fan, the mold pieces are newly formed to change the circumferential position of the notch 221.

The notch 221 is formed by the moving mold piece for the impeller cup. Thus, by changing the circumferential positioning of the moving mold piece for the impeller cup with respect to an entire mold structure, the circumferential position of the notch 221 can be changed. The notch 221 can reduce the rotational unbalance occurring in a direction from the rotation axis J1 to the notch 221. However, it is practically impossible to make the rotational unbalance value of the impeller 2 zero for which the correction has been already performed. The direction from the rotation axis to the position of the portion causing the rotational unbalance of the impeller 2 can be determined by referring to the notch 221 as an index.

Figure 6:
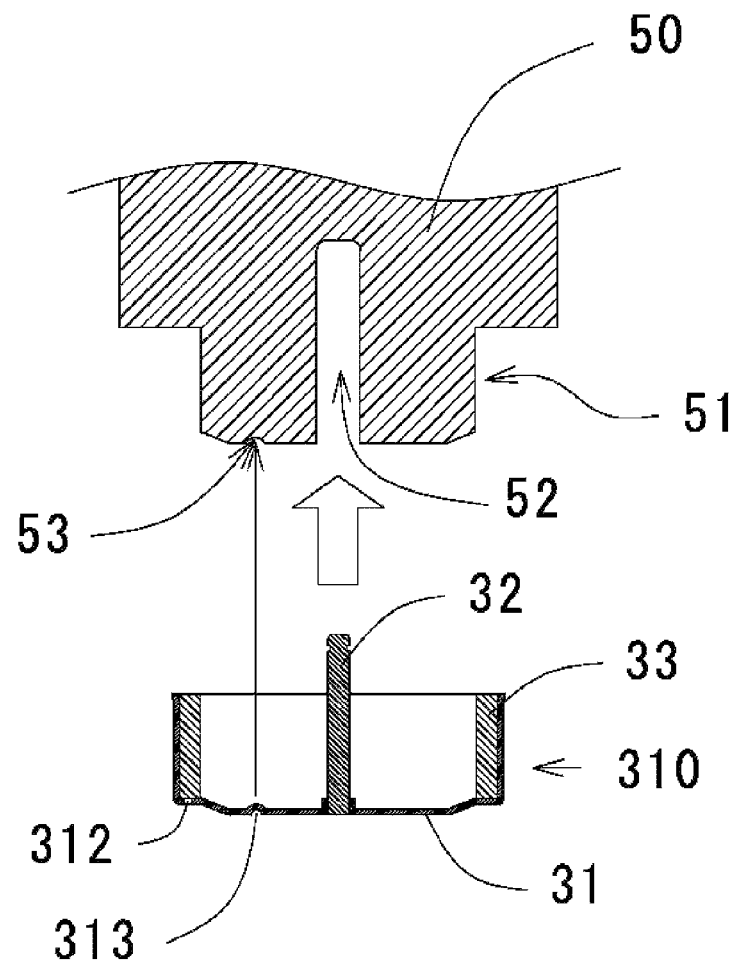
FIG. 6 is a cross-sectional view illustrating a combination of a rotor assembly and a jig according to the first preferred embodiment of the present invention.
Figure 7:
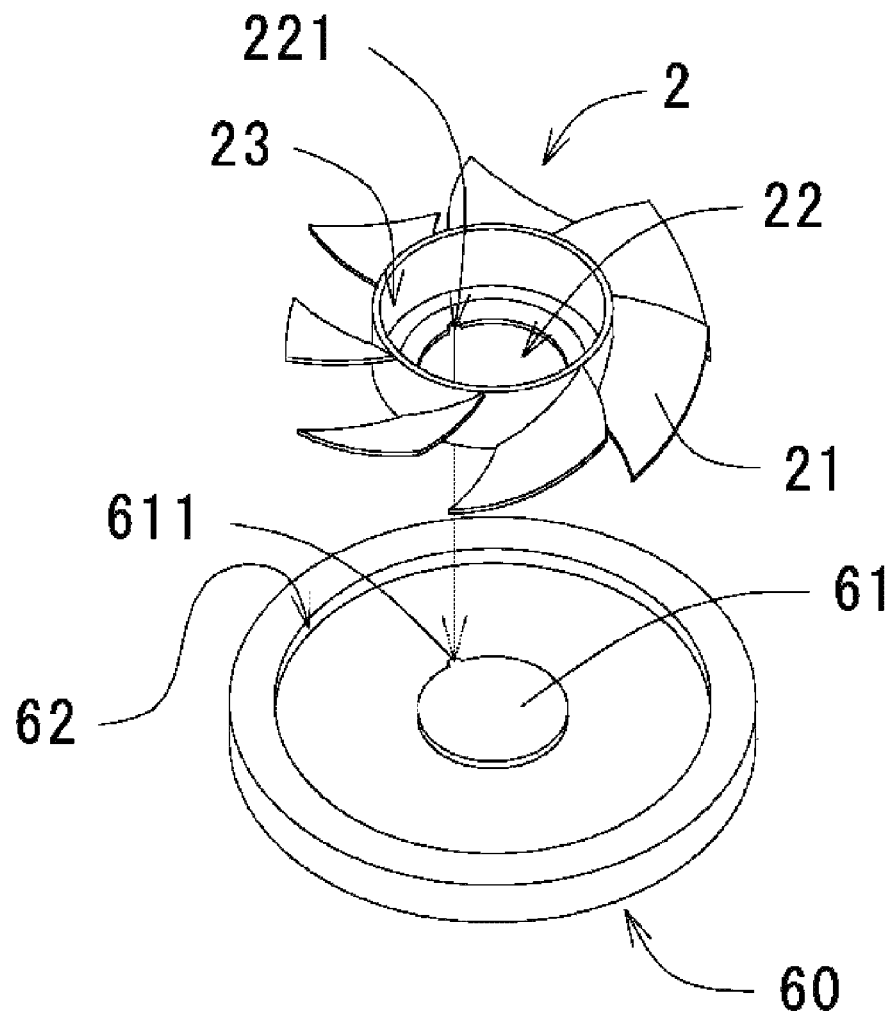
FIG. 7 is a perspective view illustrating a combination of an impeller and an impeller base.

The impeller 2 and the rotor assembly 310 are combined with each other, as shown in FIG. 2. Details of the combination are now described. FIG. 6 is a cross-sectional view of the rotor assembly 310 and a jig for the rotor assembly 310. FIG. 7 illustrates a manner of placing the impeller 2 on a jig. FIG.

8 is a cross-sectional view illustrating a combination of the impeller 2 and the rotor assembly 310.

Figure 8:
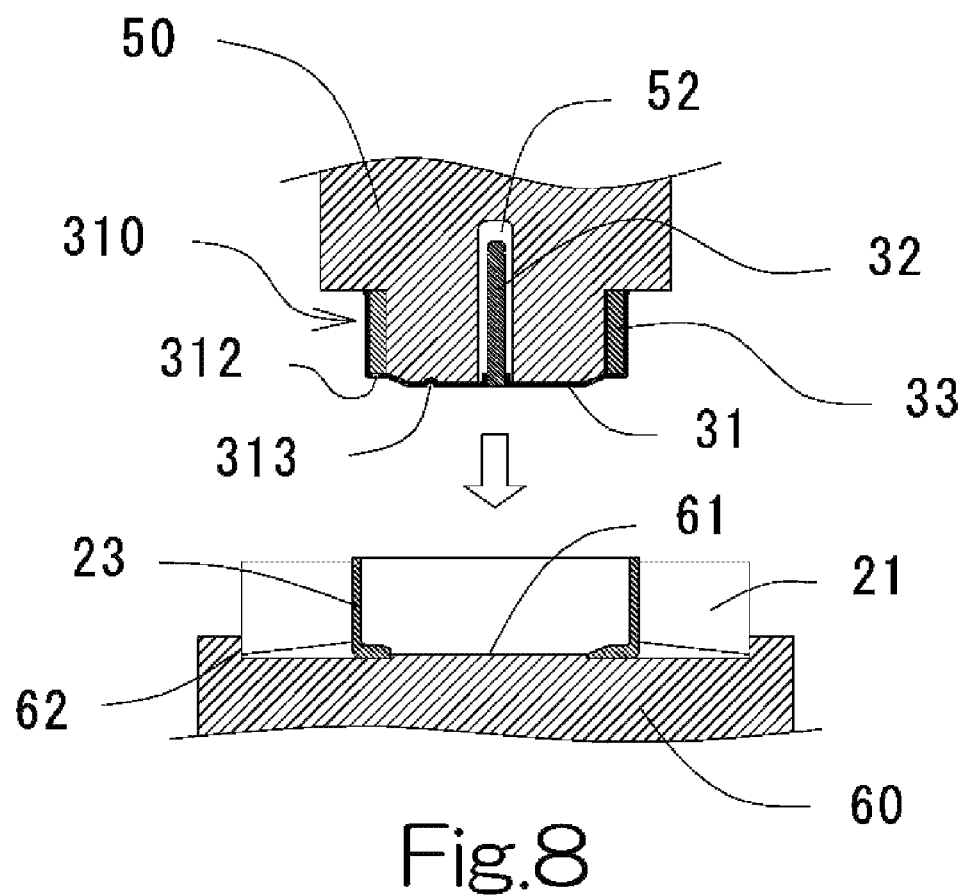
FIG. 8 is a cross-sectional view illustrating a combination of the impeller and the rotor assembly.

As shown in FIG. 8, the rotor assembly 310 and the impeller 2 are attached to exclusive jigs, and are then combined with each other by a pressing machine utilizing a compressor, a servo press-fitting machine utilizing a servo motor, or the like. Although the rotational unbalance has already been corrected for each of the rotor assembly 310 and the impeller 2, the rotational unbalance values of each of the rotor assembly 310 and the impeller 2 is not zero. Therefore, it is necessary to balance the rotational unbalances of the impeller 2 and the rotor assembly 310 when the rotor assembly 310 is press-fitted into the impeller 2, thereby reducing the rotational unbalance value of the impeller assembly 20 (i.e., the combination of the impeller 2 and the rotor assembly 310).

First, the rotor assembly 310 and an exclusive jig for the rotor assembly 310, i.e., a rotor attaching jig 50 are described. As shown in FIG. 6, the rotor attaching jig 50 includes a rotor supporting portion 51 for supporting an inner circumferential surface of the rotor yoke 31 and a shaft insertion hole 52 for receiving the shaft 32 therein. The shaft insertion hole 52 is arranged at a center of the rotor supporting portion 51. The rotor attaching jig 50 is preferably formed of a magnetic material such as mild steel. Therefore, the rotor assembly 310 is held by the rotor supporting portion 51 by a magnetic force of the rotor magnet 33.

The rotor assembly 310 has to be circumferentially positioned and held with respect to the rotor attaching jig 50 in a specific manner in order to make rotational unbalance of the rotor assembly 310 and the rotational unbalance of the impeller 2 offset each other. In this preferred embodiment, a convex portion 313 that is convex toward an open end of the rotor yoke 31 is formed on the bottom surface of the rotor yoke 31. Since the rotor yoke 31 is formed by pressing as described before, the die for the rotor yoke 31 is designed to form the convex portion 313 on the bottom surface of the rotor yoke 31. In place of the convex portion 313, a concave portion may be formed at the center of the bottom of the rotor yoke 31. In this case, the mold is designed to form the concave portion. Moreover, a positioning concave portion 53 is formed on an end surface of the rotor attaching jig 50 which is to be opposed to the bottom surface of the rotor yoke 31, at a position corresponding to the convex portion 313 (or concave portion). The rotor assembly 310 is inserted into and held by the rotor attaching jig 50 with the convex portion 313 engaging with the positioning concave portion 53.

Figure 9:
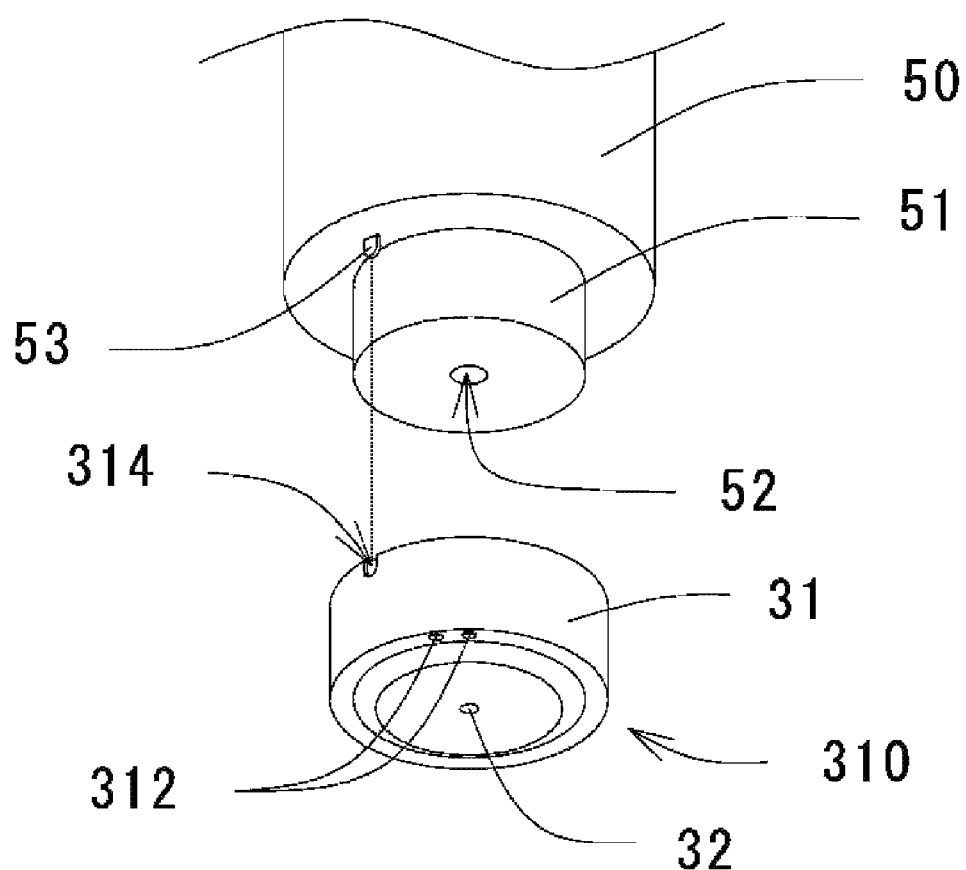
FIG. 9 is a perspective view illustrating a modified example of a rotor yoke index formed on the rotor yoke.

Alternatively, a method can be used in which a notch 314 is formed at an opening end of a circumferential wall of the rotor yoke 31, as shown in FIG. 9. In this case, the rotor attaching jig 50 is provided with a positioning convex portion 53 formed radially outside the rotor supporting portion 51. The positioning convex portion 53 is outside and away from the rotor supporting portion 51. The rotor assembly 310 is held by the rotor attaching jig 50 with the notch 314 engaging with the positioning convex portion 53 of the rotor attaching jig 50.

The rotor yoke 31 may be provided with an engagement feature formed by any of a notch, a through hole, a concave portion, and a convex portion, while the rotor attaching jig may be provided with a positioning feature formed by a convex portion or a concave portion to correspond to the engagement feature of the rotor yoke 31. In this case, the rotor yoke 31 is circumferentially positioned by engagement of the engagement feature of the rotor yoke 31 with the positioning feature of the rotor attaching jig 50. A method for circumferentially positioning the rotor yoke 31 with respect to the rotor attaching jig 50 is not limited to the above.

Next, referring to FIG. 7, the impeller 2 and an exclusive jig of the impeller 2, i.e., an impeller base 60, are described. At a center of the impeller base 60 is arranged a fitting convex portion 61, as shown in FIG. 7. The fitting convex portion 61 is in the shape of a cylindrical column and is to be inserted into the impeller opening 22. The fitting convex portion 61 is provided with a positioning convex portion 611 on its outer circumferential surface. The positioning convex portion 611 is shaped to correspond to the notch 221 provided on the inner peripheral edge of the bottom of the impeller cup 23. The impeller base 60 further includes an outer wall 62 on or near an outer periphery of the impeller base 60. The outer wall 62 supports the outer circumference of the impeller 2. The impeller 2 is placed on the impeller base 60 with the notch 221 engaging the positioning convex portion 611. Thus, the impeller 2 can be circumferentially positioned with respect to the impeller base 60.

Figure 10:
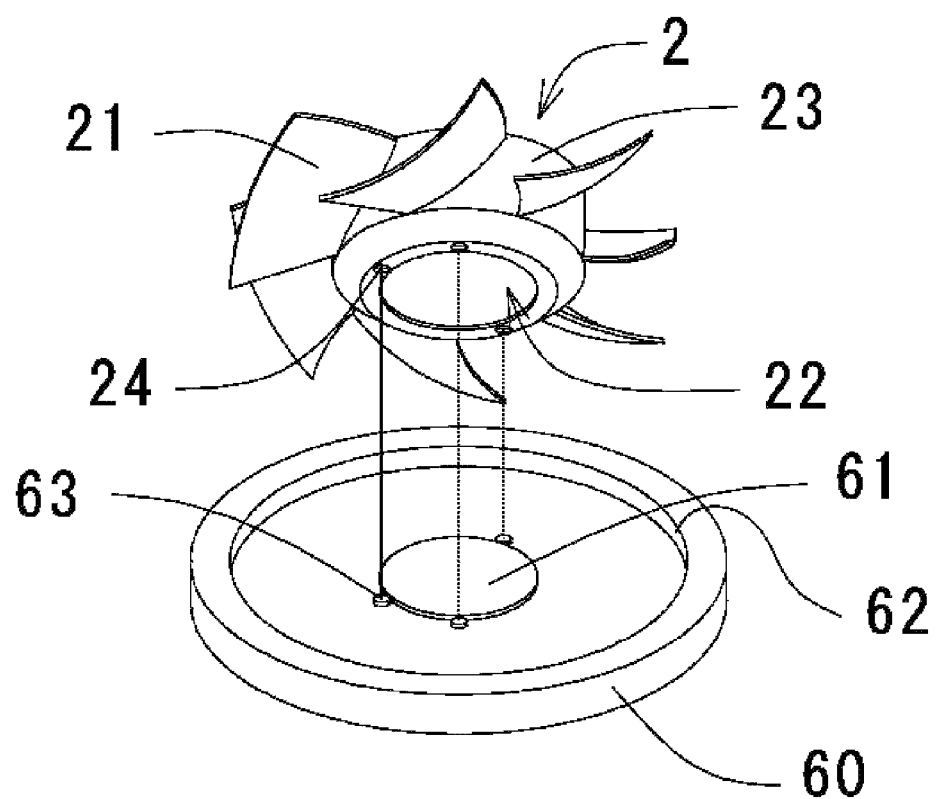
FIG. 10 is a perspective view illustrating a modified exemplary combination of the impeller and the impeller base.
Figure 14:
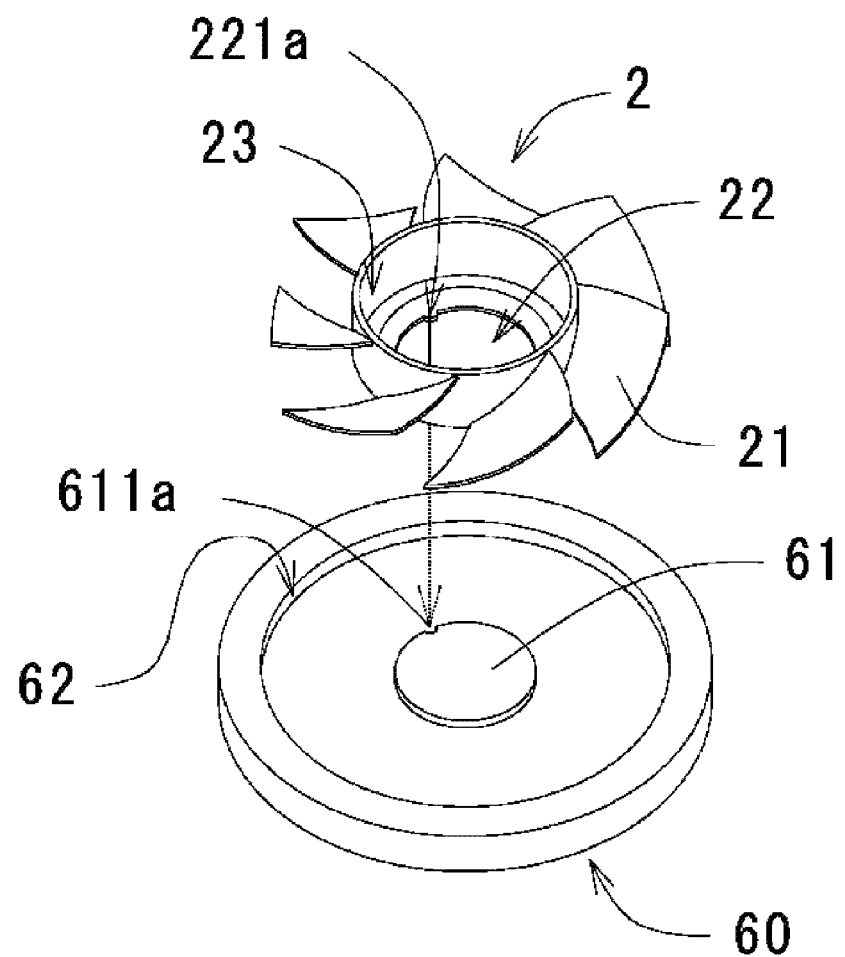
FIG. 14 is a perspective view illustrating a modified exemplary combination of the impeller and the impeller base.

Exemplary modifications of the circumferential positioning of the impeller 2 with respect to the impeller base 60 are described. FIG. 14 shows an example in which a convex portion 221a is provided on the inner peripheral edge of the bottom of the impeller cup 23 to project radially inward. In this case, a concave portion 611a is provided on the outer circumferential surface of the fitting convex portion 61 of the impeller base 60. In another example shown in FIG. 10, a concave portion 24 used for circumferentially positioning the impeller 2 with respect to the rotation axis is provided on the bottom surface of the impeller 2 that is opposed to the impeller base 60. In this case, a positioning convex portion 63 is provided at a position corresponding to the concave portion 24. FIG. 10 shows a case where three concave portions 24 and three positioning convex portions 63 corresponding thereto are provided. The impeller 2 is circumferentially positioned with respect to the impeller base 60 by engagement of the concave portion 24 with the corresponding positioning convex portion 63.

Figure 13:
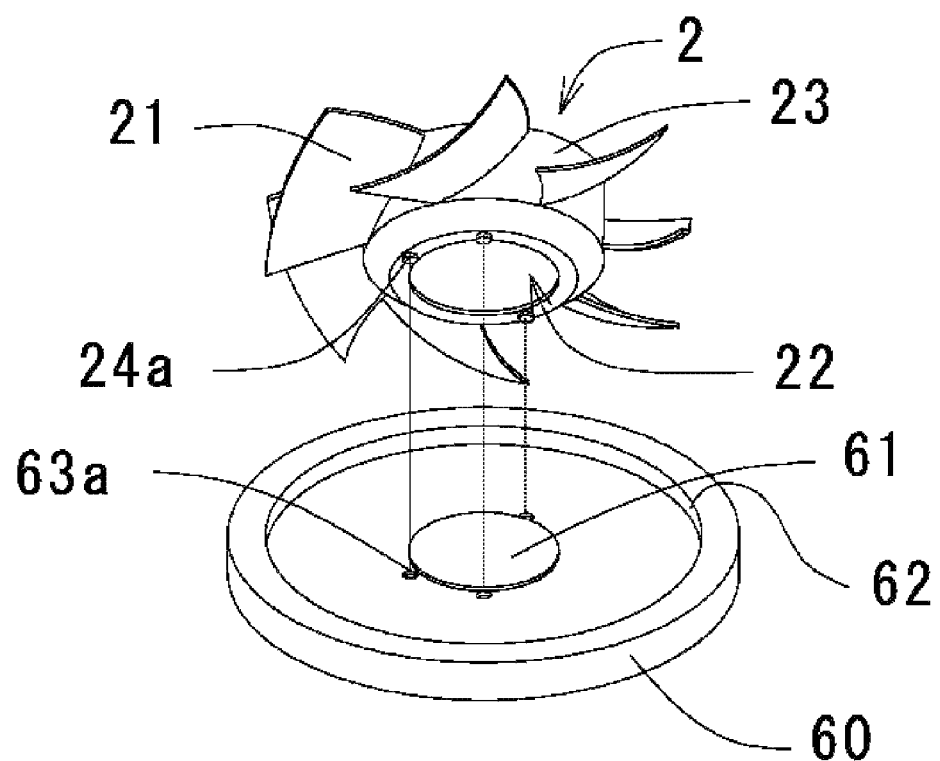
FIG. 13 is a perspective view illustrating a modified exemplary combination of the impeller and the impeller base.

However, in place of the concave portion 24, a convex portion 24a may be provided on the bottom surface of the impeller 2 that is opposed to the impeller base 60, as shown in FIG. 13. In this case, a concave portion of the mold piece for the impeller 2, which forms the convex portion 24a, can be engraved in the mold piece for the impeller 2 when the mold piece is made. Therefore, the cost of the mold can be minimized. A method for circumferentially positioning the impeller 2 with respect to the impeller base 60 is not limited to the above. Any positioning method can be used.

Next, referring to FIG. 8, how to combine the rotor yoke 31 attached to the rotor attaching jig 50 with the impeller 2 mounted on the impeller base 60 is described. The rotor attaching jig 50 is attached to an upper portion of the pressing machine such that the bottom of the rotor yoke 31 faces downward, as shown in FIG. 8. The impeller base 60 is attached to a lower portion of the pressing machine with a surface for mounting the impeller 2 thereon facing upward. In this state, the pressing machine is started. The rotor attaching jig 50 then moves toward the impeller base 60 so as to press-fit the rotor assembly 310 into the impeller 2.

In this press-fitting, it is necessary to offset the rotational unbalance of the impeller 2 and that of the rotor assembly 310 to each other. Therefore, the rotor attaching jig 50 and the impeller base 60 are secured in the pressing machine at positions at which the rotational unbalances of the impeller 2 and the rotor assembly 310 are offset by each other, with respect to the pressing machine. That is, the rotational unbalance of the impeller 2 and that of the rotor assembly 310 that has already been press-fitted into the impeller 2 are offset by each other.

In order to offset the rotational unbalances of the impeller 2 and the rotor assembly 310, it is ideal to combine the impeller 2 and the rotor assembly 310 such that directions of the rotational unbalances from the rotation axis are symmetrical with respect to the rotation axis, that is, are opposite to each other. However, coaxiality and circularity of each of the impeller 2 and the rotor assembly 310 are not completely zero. Therefore, variations of the coaxiality and circularity have to be taken into consideration when the impeller 2 and the rotor assembly 310 are combined with each other.

For example, a case is discussed in which the impeller 2 and the rotor assembly 310 are different from each other in coaxiality. In this case, even if the impeller 2 and the rotor assembly 310 are combined with each other to make circumferential positions of the rotational unbalances symmetrical with respect to the rotation axis, an axis for rotation of the impeller 2 does not coincide with that of the rotor assembly 310. Similarly, in a case where the impeller 2 and the rotor assembly 310 are different from each other in circularity, the impeller 2 is combined with the rotor assembly 310 while being deformed in accordance with the circularity of the rotor assembly 310. This is because the impeller 2 is formed of resin having a lower Young's modulus than that of the metal forming the rotor assembly 310. For the reasons described above, the impeller 2 and the rotor assembly 310 are combined with each other in various ways to make the circumferential positional relationships between them different, and the rotational unbalance of the combined impeller 2 and rotor assembly 310 is measured for each combination. Based on the measurement, one combination providing the smallest rotational unbalance is determined as the most appropriate combination.

Then, the impeller base 60 and the rotor attaching jig 50 are attached to the pressing machine to achieve the most appropriate combination of the impeller 2 and the rotor assembly 310 thus determined. In this manner, it is possible to offset the rotational unbalances of the impeller 2 and the rotor assembly 310 from each other in an ideal way, i.e., correct the rotational unbalances thereof, irrespective of the operator's ability. Please note that, when at least one of the mold for the impeller and the die for the rotor yoke is changed, the position of the rotational unbalance, coaxiality, and circularity of a corresponding one of the impeller 2 and the rotor assembly 310 are also changed. Therefore, for every combination of the mold for the impeller and the die for the rotor yoke, it is necessary to study the most appropriate circumferential positional combinations of the impeller and the rotor yoke.

In accordance with the above-described steps, correction of the rotational unbalance can be achieved, which does not depend on an operator's ability, and is capable of minimizing the rotational unbalance. Moreover, since the circumferential positions of the impeller 2 and the rotor yoke 31 can be fixed by means of the jigs, the number of steps can be reduced.

Second Preferred Embodiment

Figure 15:
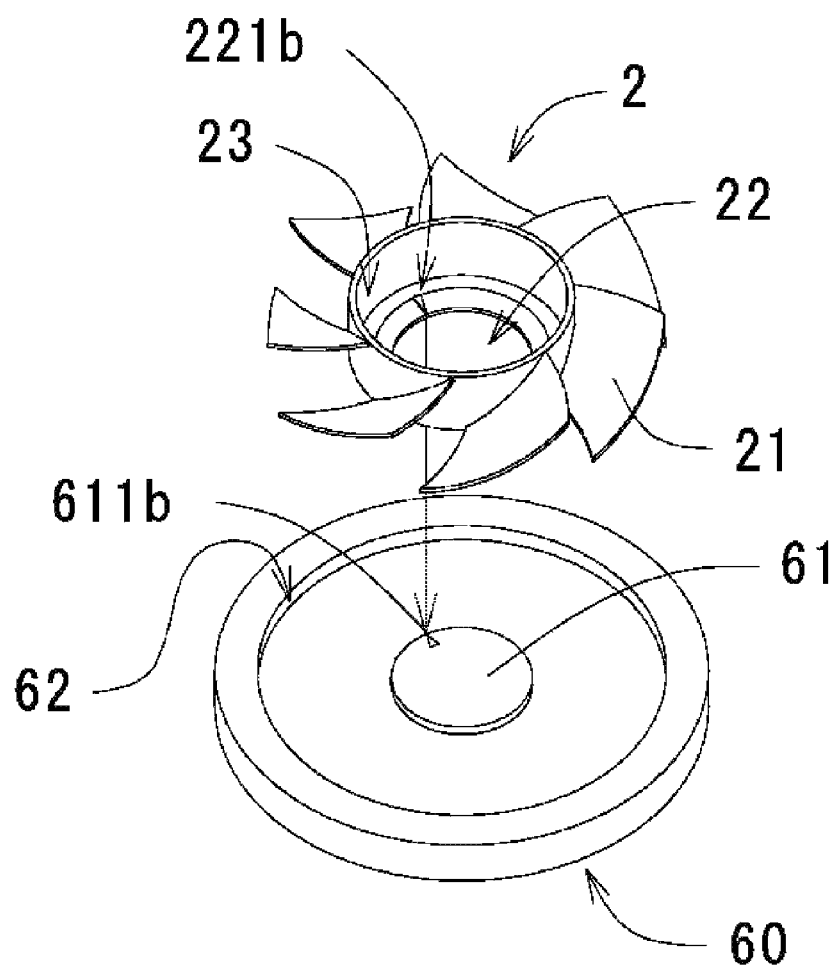
FIG. 15 is a perspective view illustrating a combination of an impeller and an impeller base according to a second preferred embodiment of the present invention.

A fan according to a second preferred embodiment is now described. FIG. 15 is a perspective view showing a combination of an impeller and an impeller base according to the second preferred embodiment. The structure of the combined impeller 2 and impeller base 60 is different from those in FIGS. 7, 10, 13, and 14. Except for that, the structure of the fan of the second preferred embodiment is preferably the same as those shown in FIGS. 1 to 6, FIGS. 8, 9, 11, and 12 and is therefore labeled with the same reference numerals as those in the first preferred embodiment.

In the impeller assembly 20 of the fan of the second preferred embodiment, an index 221b in the form of a radially inward arrow is provided inside the impeller cup 23 of the impeller 2 on the bottom of the impeller cup 23 so as to face the inner peripheral edge of the impeller cup 23, as shown in FIG. 15. The shape of the index 221b is not limited to an arrow. The index 221b is formed to be convex at the same time of forming the impeller 2 by insertion molding. Therefore, when the mold piece for the impeller 2 used for injection molding is formed, a portion of the mold piece corresponding to the index 221b can be engraved, thus reducing the cost for manufacturing the mold.

Next, the impeller base 60, which is used when the impeller 2 and the rotor assembly 310 are combined with each other, is described. The impeller base 60 is provided with a fitting convex portion 61 at its center, as shown in FIG. 15. The fitting convex portion 61 is in the form of a cylindrical column and corresponds to the opening 22 of the impeller 2. On an upper surface of the fitting convex portion 61 is formed an index 611b in the form of a radially outward arrow facing an outer peripheral edge of the fitting portion 61. The impeller base 60 is further provided with an outer wall 62 on or near its outer periphery. The outer wall 62 holds the outer circumference of the impeller 2. The impeller 2 is placed on the impeller base 60 such that a pointed end of the index 221b of the impeller 2 is substantially coincident with a pointed end of the index 611b of the impeller base 60. Thus, when an operator combines the impeller 2 and the rotor assembly 310, it is possible to make a variation in the circumferential positions of the impeller 2 with respect to the impeller base 60 smaller, irrespective of the operator's ability.

The fan A is required to have lightning surge resistance under some operating conditions, especially in a case where the fan A is mounted in an electronic device used outside. The rotor yoke 31 of the fan A is not covered but exposed to the outside. Under normal operating conditions, there arises no problem with the exposed rotor yoke 31. However, if the electronic device is used outside and is struck by lightning, a high voltage may be applied to the circuit board 38 through the rotor yoke 31 to cause damage of the circuit that controls the rotation of the fan A.

In order to prevent this problem, a sticker or adhesive label that is made of an insulating material is placed on the bottom to close the opening 22 of the impeller 2. This sticker or adhesive label can easily come detached if the notch 221 is formed on the bottom of the impeller cup 23 of the impeller 2 as in the first preferred embodiment, or the concave portion 24 or the convex portion 24a is formed on the bottom of the impeller cup 23 of the impeller 2 as in the modifications described above. For this reason, in a case of placing a sticker or adhesive label on the bottom of the impeller 2, it is necessary to use the structure of this preferred embodiment. That is, the structure of this preferred embodiment has advantages in a case of placing a sticker or adhesive label on the bottom of the impeller 2.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A fan comprising:
a shaft;
a hollow, approximately cylindrical rotor yoke connected to the shaft and arranged to rotate around the shaft as a rotation axis;
a rotor magnet secured to an inner circumference of the rotor yoke; and an impeller secured to an outer circumference of the rotor yoke and arranged to rotate together with the rotor yoke to generate an air flow; wherein the impeller is provided with at least one index arranged on the impeller to provide accurate circumferential positioning of the impeller with respect to the rotor yoke;

the rotor yoke is provided with at least one index arranged on the rotor yoke to provide accurate circumferential positioning of the rotor yoke with respect to the impeller; and the impeller and the rotor yoke are arranged to contact each other such that the at least one index on the impeller does not come into contact with the at least one index of the rotor yoke; wherein the impeller is hollow, and the rotor yoke is inserted into the impeller from an axial end of the impeller; the impeller includes a surface at another axial end thereof, and the surface includes an approximately circular hole at its center centered about the rotation axis; and the at least one index comprising at least one of a notch and a projection arranged on an inner edge of the surface of the impeller that defines the approximately circular hole, the notch being concave away from the rotation axis or the projection projecting toward the rotation axis.

2. The fan according to claim 1, wherein the impeller is hollow, and the rotor yoke is inserted into the impeller from an axial end of the impeller; and the impeller includes a surface at another axial end thereof, and the surface includes at least one of a through hole, a concave portion, and a convex portion arranged therein or thereon as the at least one index.

3. The fan according to claim 1, wherein the at least one index of the impeller includes a plurality of indexes; and the impeller does not possess rotational symmetry due to the plurality of indexes of the impeller being irregularly positioned on the impeller.

4. The fan according to claim 1, wherein the at least one index of the rotor yoke includes a plurality of indexes; and the rotor yoke does not possess rotational symmetry due to the plurality of indexes of the rotor yoke being irregularly positioned on the rotor yoke.

5. A fan comprising:

a hollow, approximately cylindrical rotor yoke arranged to rotate around a rotation axis; and an impeller attached to an outer circumference of the rotor yoke and arranged to rotate together with the rotor yoke to generate an air flow; wherein the rotor yoke is provided with at least one index arranged on the rotor yoke to provide accurate circumferential positioning of the rotor yoke with respect to the impeller;

the impeller is provided with at least one index arranged on the impeller to provide accurate circumferential positioning of the impeller with respect to the rotor yoke; and the impeller and the rotor yoke are arranged to contact each other such that the at least one index on the impeller does not come into contact with the at least one index of the rotor yoke wherein the rotor yoke is open toward an axial end, a rotor magnet is inserted into the rotor yoke from the axial end; and at least one notch is arranged on an edge of the rotor yoke at the axial end as the at least one index.

6. The fan according to claim 5, wherein the rotor yoke is open toward an axial end, and a rotor magnet is inserted into the rotor yoke from the one axial end to be secured to an inner circumference of the rotor yoke; and at least one of a through hole, a concave portion, and a convex portion is provided at another axial end of the rotor yoke as the at least one index.

7. The fan according to claim 6, wherein the rotor yoke is a pressed member with the at least one index arranged therein or thereon.

8. The fan according to claim 5, wherein the rotor yoke is a pressed member with the at least one notch arranged therein.

9. The fan according to claim 5, wherein the at least one index of the rotor yoke includes a plurality of indexes; and the rotor yoke does not possess rotational symmetry due to the plurality of indexes of the rotor yoke being irregularly positioned on the rotor yoke.

10. The fan according to claim 5, wherein the at least one index of the impeller includes a plurality of indexes; and the impeller does not possess rotational symmetry due to the plurality of indexes or the impeller being irregularly positioned on the impeller.

* * * * *